US011232540B2

(12) United States Patent
Hayami

(10) Patent No.: US 11,232,540 B2
(45) Date of Patent: Jan. 25, 2022

(54) COMPOSITE VIDEO IMAGE CREATION APPARATUS, COMPOSITE VIDEO IMAGE CREATION METHOD, AND COMPOSITE VIDEO IMAGE CREATION PROGRAM

(71) Applicant: MURAKAMI CORPORATION, Shizuoka (JP)

(72) Inventor: Atsushi Hayami, Yokohama (JP)

(73) Assignee: MURAKAMI CORPORATION, Shizuoka (JP)

( * ) Notice: Subject to any disclaimer, the term of this patent is extended or adjusted under 35 U.S.C. 154(b) by 18 days.

(21) Appl. No.: 17/018,414

(22) Filed: Sep. 11, 2020

(65) Prior Publication Data

US 2020/0410641 A1    Dec. 31, 2020

Related U.S. Application Data

(63) Continuation of application No. PCT/JP2019/009964, filed on Mar. 12, 2019.

(30) Foreign Application Priority Data

Mar. 15, 2018  (JP) .............................. JP2018-047600

(51) Int. Cl.
  *G06T 3/40*  (2006.01)
  *G06T 7/187*  (2017.01)
  (Continued)

(52) U.S. Cl.
  CPC ............ *G06T 3/4038* (2013.01); *G06T 7/187* (2017.01); *G06T 7/37* (2017.01); *G06T 7/97* (2017.01)

(58) Field of Classification Search
  CPC ......... G06T 3/4038; G06T 7/187; G06T 7/37; G06T 7/97; H04N 7/181
  See application file for complete search history.

(56) References Cited

U.S. PATENT DOCUMENTS

2016/0176343 A1   6/2016  Sakano et al.
2017/0011539 A1   1/2017  Oshima et al.
(Continued)

FOREIGN PATENT DOCUMENTS

JP   2007-049276   2/2007
JP   2016-070814   5/2016
(Continued)

OTHER PUBLICATIONS

International Search Report (ISR) from International Searching Authority (Japan Patent Office) in International Pat. Appl. No. PCT/JP2019/009964, dated May 28, 2019.
(Continued)

*Primary Examiner* — John B Strege
*Assistant Examiner* — Daniel C Chang
(74) *Attorney, Agent, or Firm* — Greenblum & Bernstein, P.L.C.

(57) ABSTRACT

With respect to two images acquired from two video images including a mutually-overlapping area in which the two video images overlap each other, an image transformation matrix for mapping coordinate systems is sequentially generated. Coordinate transformation of at least one image of the images is performed using the generated image transformation matrix. A composite image is created by overlaying two images with the at least one image subjected to the coordinate transformation. The currently used image transformation matrix and the newly generated image transformation matrix are compared with each other. If the two image transformation matrices are similar, the coordinate transformation is performed using the currently used image transformation matrix continuously. If the two image transformation matrices are dissimilar, the coordinate transformation is performed using an image transformation matrix
(Continued)

corrected with the newly generated image transformation matrix.

12 Claims, 3 Drawing Sheets

(51) Int. Cl.
  *G06T 7/00* (2017.01)
  *G06T 7/37* (2017.01)

(56) References Cited

U.S. PATENT DOCUMENTS

| | | |
|---|---|---|
| 2017/0061622 A1 | 3/2017 | Sakano et al. |
| 2017/0297491 A1 | 10/2017 | Tanaka et al. |

FOREIGN PATENT DOCUMENTS

| | | | | |
|---|---|---|---|---|
| JP | 2016-078484 | | 5/2016 | |
| KR | 20140015892 A | * | 2/2014 | |
| WO | 2015/029934 | | 3/2015 | |
| WO | 2015/129280 | | 9/2015 | |
| WO | WO-2016086754 A1 | * | 6/2016 | ............... G06T 5/50 |

OTHER PUBLICATIONS

Written Opinion from International Searching Authority (Japan Patent Office) in International Pat. Appl. No. PCT/JP2019/009964, dated May 28, 2019.

"Feature Based Panoramic Image Stitching", Searched on Mar. 6, 2018, the Internet <URL: https://jp.mathworks.com/help/vision/examples/feature-based-panoramic-image-stitching.html>, together with an English language translation.

* cited by examiner

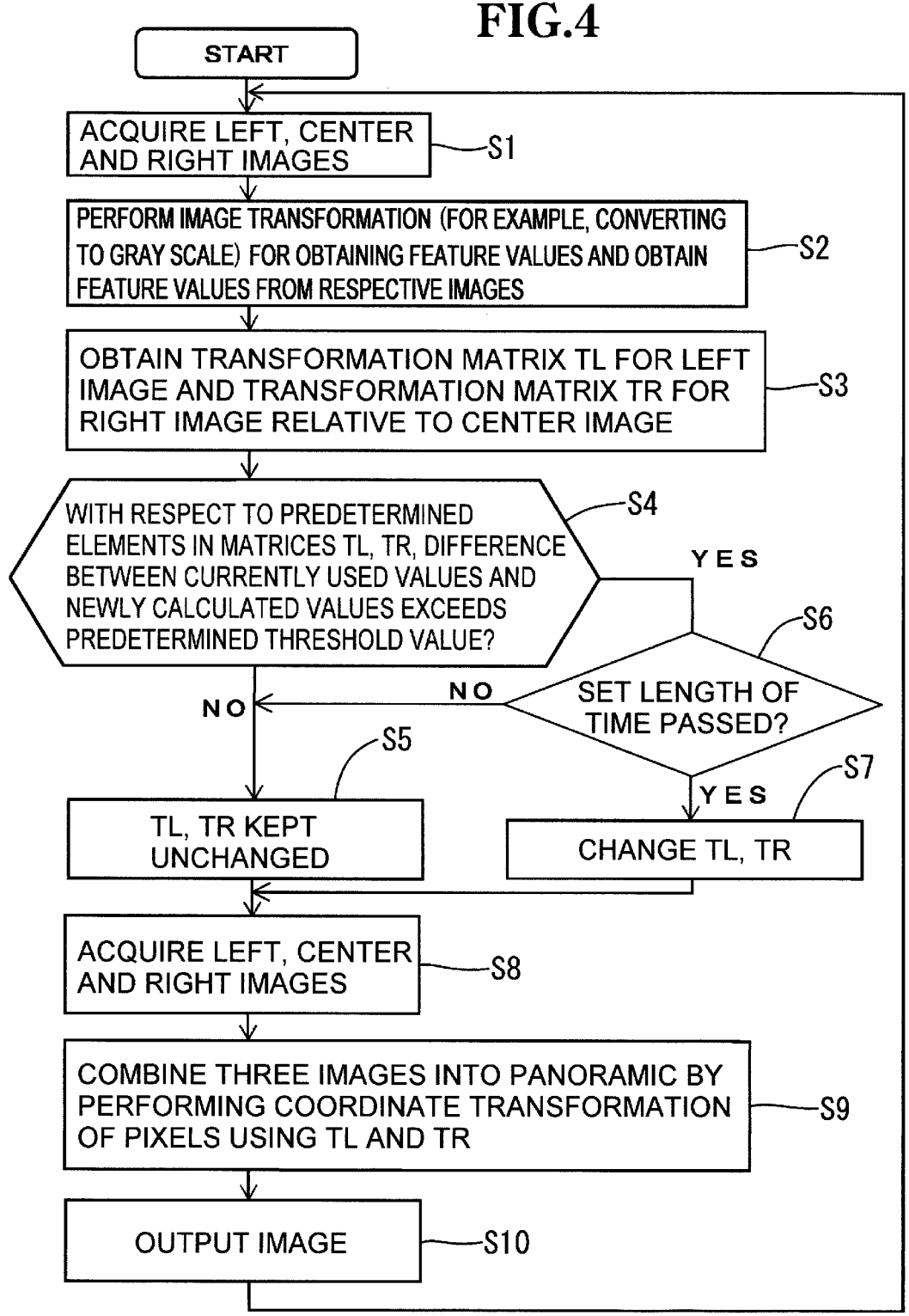

COMPOSITE VIDEO IMAGE CREATION APPARATUS, COMPOSITE VIDEO IMAGE CREATION METHOD, AND COMPOSITE VIDEO IMAGE CREATION PROGRAM

CROSS-REFERENCE TO RELATED APPLICATIONS

This application is a bypass continuation of International Patent Application No. PCT/JP2019/009964, filed Mar. 12, 2019, which claims the benefit of Japanese Patent Application No. 2018-047600, filed Mar. 15, 2018. The disclosure of each of the above-mentioned documents, including the specification, drawings, claims, and abstract, is incorporated herein by reference in its entirety.

TECHNICAL FIELD

This invention relates to a composite video image creation apparatus, a composite video image creation method and a composite video image creation program for creating a composite video image by stitching two or more video images in which each adjacent two video images each include a mutually-overlapping area in which the two video images overlap each other.

BACKGROUND ART

Composite image creation techniques that create a composite image (e.g., a panoramic image) by stitching two or more images in which each adjacent two video images each include a mutually-overlapping area in which the two video images overlap each other have been in practical use. Examples of the composite image creation techniques that are currently in practical use include one that performs a series of processes as follows. With respect to two images each including a mutually-overlapping area in which the two images overlap each other, respective feature points are detected. Feature values of the feature points are extracted. Corresponding points in the two images are detected based on the feature values. An image transformation matrix for alignment of the two images is calculated based on coordinates of the corresponding points. Using the image transformation matrix, coordinate transformation of one of the images is performed to match coordinate systems of the two images with each other. The two images are overlaid on each other to create a composite image. Two or more images can be stitched together by performing the above series of processes for each pair of adjacent two images. This composite image creation technique is disclosed in, for example, Non-Patent Literature 1.

CITATION LIST

Non-Patent Literature

Non-Patent Literature 1: "Feature Based Panoramic Image Stitching", [Searched on Mar. 6, 2018], the Internet <URL: https://jp.mathworks.com/help/vision/examples/feature-based-panoramic-image-stitching.html>

SUMMARY OF INVENTION

Technical Problem

Applying the above composite image creation technique to video images (moving images) enables creation of a composite video image in which two video images each including a mutually-overlapping area in which the two video image overlap each other are stitched together via the area. This composite video image creation technique can be used for, for example, what is called an electronic mirror for a vehicle. The electronic mirror is configured, for example, as follows. Cameras are disposed so as to face the left side, the center side and the right side of the rear side of the vehicle. Each adjacent two video images (that is, left and center video images and center and right video images) in video images from the cameras are stitched together to create a continuous panoramic video image. The created panoramic video image is displayed on an image display apparatus, such as a liquid-crystal display, disposed in front of a driver's seat to be viewed by a driver.

Where a composite image creation technique is applied to an electronic mirror, movements of cameras relative to one another due to, e.g., shaking of a vehicle may frequently cause misalignment of images from the respective cameras. Then, if image transformation matrices are updated (corrected) each time misalignment of images from the cameras occurs, flickering (fluctuation) occurs in a displayed panoramic video image, which may bother a driver and consequently interfere with driving of the vehicle.

This invention provides a composite video image creation apparatus, a composite video image creation method and a composite video image creation program that solve the aforementioned problem and suppress flickering in a composite video image.

Solution to Problem

This invention provides a composite video image creation apparatus for creating a composite video image by stitching two video images each including a mutually-overlapping area in which the two video images overlap each other, via the mutually-overlapping areas, the composite video image creation apparatus including an image acquisition section, a feature value extraction section, an image transformation matrix generation section, an image transformation section, an image output section and a correction determination section, wherein the image acquisition section sequentially acquires two images, one from each of the two video images, the feature value extraction section detects respective feature points with respect to the acquired two images and extracts respective feature values of the detected feature points, the image transformation matrix generation section detects corresponding points in the two images based on the extracted feature values of the feature points, and sequentially generates an image transformation matrix for mapping coordinate systems of the two images to each other (for example, matching the coordinate systems with each other, performing coordinate matching or aligning the mutually-overlapping areas), based on coordinates of the detected corresponding points, the image transformation section performs coordinate transformation of at least one image of the two images using the generated image transformation matrix to perform mapping of the coordinate systems of the two images to each other, the image output section creates a composite image by overlaying the two images with the respective coordinate systems mapped to each other, and outputs the composite image, the correction determination section compares the currently used image transformation matrix and the newly generated image transformation matrix with each other to determine whether or not the two image transformation matrices are similar, based on a predetermined determination criterion for determining a degree of difference or a degree of similarity between the two image transformation matrices, and if it is determined that the two image transformation matrices are similar, makes the image transformation section perform the coordinate transformation using the currently used image transformation matrix continuously, and if it is determined that the two image transformation matrices are dissimilar, makes the image transformation section perform the coordinate transformation using an image transformation matrix corrected with the newly generated image transformation matrix (for example, being changed to the newly generated image transformation matrix), and the composite video image creation apparatus creates the composite video image by sequentially performing creation of the composite image according to progress of time. Accordingly, frequent update of the image transformation matrix is suppressed, and thus, flickering in the composite video image is suppressed, and as a result, botheration given to a viewer of the composite video image can be reduced.

It is possible that the image transformation matrix is, for example, an image transformation matrix for mapping the coordinate system of one image of the two images to the coordinate system of the other image. Accordingly, the coordinate systems of the two images can be mapped to each other by performing coordinate transformation of the one image of the two images.

It is possible that the correction determination section determines the degree of difference or the degree of similarity between the two image transformation matrices using the determination criterion, in which a value based on a difference in element value (which refers to a value of each element) between respective elements corresponding to each other in the currently used image transformation matrix and the newly generated image transformation matrix is used as an index value of the determination criterion. Accordingly, correction of the image transformation matrix can be performed after determining the degree of difference or the degree of similarity between the two image transformation matrices using, as an index value, a value based on a difference in element value between elements corresponding to each other in the two image transformation matrices. For example, where the index value does not exceed a predetermined threshold value (determination criterion value) (that is, the degree of difference between the two image transformation matrices is low or the degree of similarity between the two image transformation matrices is high), it can be determined that the two image transformation matrices are similar and the currently used image transformation matrix can be used continuously. Also, if the index value exceeds the predetermined threshold value (that is, the degree of difference between the two image transformation matrices is high or the degree of similarity between the two image transformation matrices is low), it can be determined that the two image transformation matrices are dissimilar and the image transformation matrix used for the coordinate transformation can be corrected with the newly generated image transformation matrix. For the index value based on a difference in element value between elements corresponding to each other in the two image transformation matrices, for example, the following can be used.

Total value of respective absolute values of differences in element value between all elements corresponding to each other.

Total value of respective absolute values of differences in element value between particular elements corresponding to each other.

Total value of respective square values of differences in element value between all elements corresponding to each other.

Total value of respective square values of differences in element value between particular elements corresponding to each other.

It is possible that the feature value extraction section extracts the feature values, for example, with respect to images at an appropriate time interval. Accordingly, an arithmetic operation amount can be reduced in comparison with a case where feature value extraction is performed with respect to images at all points of times (that is, of all frames).

It is possible that, for example, if it is determined that the image transformation matrices are dissimilar, the correction determination section corrects the image transformation matrix used for the coordinate transformation, with the newly generated image transformation matrix on a condition that the state in which the image transformation matrices are determined as being dissimilar lasts for a predetermined length of time. Accordingly, it is possible to suppress flickering occurring in the video images caused by the image transformation matrix being corrected due to, e.g., temporary shaking of video images.

In the composite video image creation apparatus of this invention, it is possible that with respect to three or more video images in which each adjacent two video images each include a mutually-overlapping area in which the two video images overlap each other, a composite video image is created by performing the processing in each of the respective sections for each adjacent two video images and stitching the three or more video images via the mutually-overlapping areas. Accordingly, where three or more video images are stitched together, also, flickering in a composite video image is suppressed, enabling reduction in botheration given to a viewer. A direction in which the respective images of the three or more video images are stitched together can be set in various ways, for example, as follows.

Using a coordinate system of an image at one end as a reference (that is, with the coordinate system fixed), the images are stitched sequentially in one direction up to an image at the other end.

Using a coordinate system of an image at a center as a reference, images are sequentially stitched in opposite directions up to images at opposite ends.

This invention is applicable to, for example, a viewing device for a vehicle. In such case, for example, it is possible that with respect to three video images of a left side, a center side and a right side of a rear side of a vehicle, in which each adjacent two video images each include a mutually-overlapping area in which the two video images overlap each other, a composite video image is created by performing each of the processes for each adjacent two video images and stitching the three video images via the mutually-overlapping areas. Accordingly, a panoramic video image in which three video images of the left side, the center side and the right side of the rear side of the vehicle are stitched together can be obtained.

Where this invention is applied to the viewing device for a vehicle, it is possible that: with respect to three images acquired from the three video images, the image transformation matrix generation section generates, for example, respective image transformation matrices for mapping coordinate systems of the two images of the left side and the right side to a coordinate system of the image of the center side to each other; the image transformation section maps the coordinate systems of the images of the left side and the right side to the coordinate system of the image of the center side by performing coordinate transformation of the images of the left side and the right side using the respective generated image transformation matrices; and the image output section creates the composite image by overlaying the three images with the respective coordinate systems mapped to one another and outputs the composite image. Accordingly, the coordinate system of the video image of the center side of the rear side of the vehicle, which is important for driving the vehicle, does not change, and thus, the video image of the center side does not flicker, enabling obtainment of a panoramic video image suitable for driving.

Where this invention is applied to the viewing device for a vehicle, it is possible that the correction determination section determines the degree of difference or the degree of similarity between the two image transformation matrices using, for example, the determination criterion using, as an index value, a value based on a difference in element value between respective elements each reflecting a parallel translation amount and a difference in element value between respective elements each reflecting a rotation angle in the two image transformation matrices. It is conceivable that changes in misalignment among the coordinate systems of the video images of the left side, the center side and the right side of the rear side of the vehicle generally occur with respect to parallel translation directions and rotation directions. Therefore, from among elements of the image transformation matrices, using, as an index value, a value based on a difference in element value between respective elements each reflecting a parallel translation amount and a value based on a difference in element value between respective elements reflecting a rotation angle enables reduction in arithmetic operation amount in comparison with a case where a value based on differences between all elements corresponding to each other in the image transformation matrices is used as an index value.

A composite video image creation program of this invention is a program for causing an information processing apparatus to function as the composite video image creation apparatus of this invention. Accordingly, it is possible to cause an information processing apparatus function as the composite video image creation apparatus according to this invention.

A composite video image creation method of this invention is a method for creating a composite video image by stitching two video images each including a mutually-overlapping area in which the two video images overlap each other, via the mutually-overlapping area, the method including: sequentially acquiring two images, one from each of the two video images; sequentially generating an image transformation matrix for mapping coordinate systems of the two images to each other; performing mapping of the coordinate systems of the two images to each other by performing coordinate transformation of at least one image of the two images using the generated image transformation matrix; creating a composite image by overlaying the two images with the respective coordinate systems mapped to each other; comparing the currently used image transformation matrix and the newly generated image transformation matrix with each other, and if it is determined, based on a predetermined determination criterion for determining a degree of difference or a degree of similarity between the two image transformation matrices, that the two image transformation matrices are similar, performing the coordinate transformation using the currently used image transformation matrix continuously, and if it is determined that the two image transformation matrices are dissimilar, performing the coordinate transformation using an image transformation matrix corrected with the newly generated image transformation matrix; and creating the composite video image by sequentially performing creation of the composite image according to progress of time. Accordingly, frequent update of the image transformation matrix is suppressed, and thus, flickering in the composite video image is suppressed, and as a result, botheration given to a viewer of the composite video image can be reduced.

A composite video image creation program of this invention is a program for causing an information processing apparatus to execute the composite video image creation method of this invention.

BRIEF DESCRIPTION OF DRAWINGS

FIG. 4 is a flowchart illustrating an example of content of control of a composite video image creation operation by the composite video image creation apparatus in FIG. 1.

DESCRIPTION OF EMBODIMENT

Figure 2:
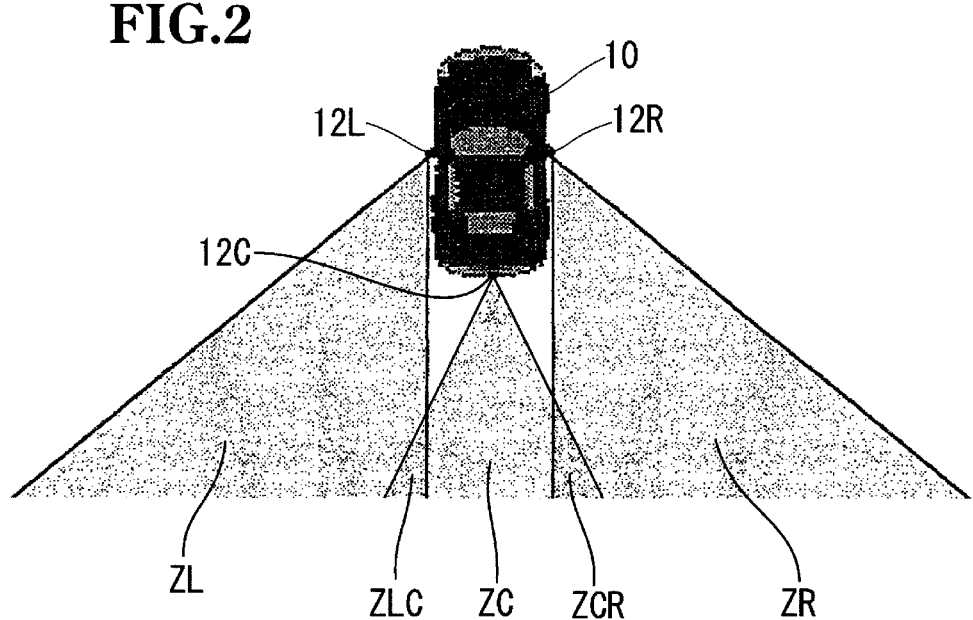
FIG. 2 is a schematic plan view illustrating an example of dispositions and fields of view of three cameras where this invention is applied to a viewing device for a vehicle, the viewing device combining video images from the three cameras disposed so as to face toward the left of the vehicle rear side, the center of the vehicle rear side and the right of the vehicle rear side, respectively, and displaying the resulting image.

An embodiment of a case where this invention is applied to a viewing device for a vehicle will be described. The viewing device for a vehicle combines video images from three cameras disposed so as to face the left side, the center side and the right side of the rear side of a vehicle, respectively, and makes the resulting composite video image (panoramic video image) be displayed on an image display apparatus, such as a liquid-crystal display, disposed in front of a driver's seat. FIG. 2 illustrates disposition of the cameras in the vehicle. In an outer left side portion (for example, left door mirror), an outer rear portion (for example, a portion around a license plate in a center in a width direction of a vehicle rear portion) and a right side portion (for example, a right door mirror) of a vehicle 10, a left camera 12L, a center camera 12C and a right camera 12R are disposed, respectively. These cameras 12L, 12C, 12R are each formed of an electronic-type camera such as a CCD camera or a CMOS camera. Respective photographing magnifications of the cameras 12L, 12C, 12R are fixed and equal to one another. The cameras 12L, 12C, 12R pick up video images (that is, continuous images) of respective fields of view at a frame rate of a predetermined number of frames per second and sequentially output video image signals of the picked-up video images. An example of the fields of view in a horizontal direction of the cameras 12L, 12C, 12R is illustrated in gray in FIG. 2. In this example, the respective fields of view in the horizontal direction of the left camera 12L, the center camera 12C and the right camera 12R are set as follows.

Field of view of the left camera 12L: Area ZL on the left side of the rear side of the vehicle 10

Field of view of center camera 12C: Area ZC on the center side of the rear side of the vehicle 10

Field of view of right camera 12R: Area ZR on the right side of the rear side of the vehicle 10

As illustrated in FIG. 2, the area ZL and the area ZC each include a mutually-overlapping area ZLC in which the area ZL and the area ZC overlap each other and the area ZC and the area ZR each include a mutually-overlapping area ZCR in which the area ZC and the area ZR overlap each other. Each of fields of view in an up-down direction of the cameras 12L, 12C, 12R is set within an appropriate angle range from an appropriate downward angle to an appropriate upward angle with the horizontal direction as a center.

Figure 1:
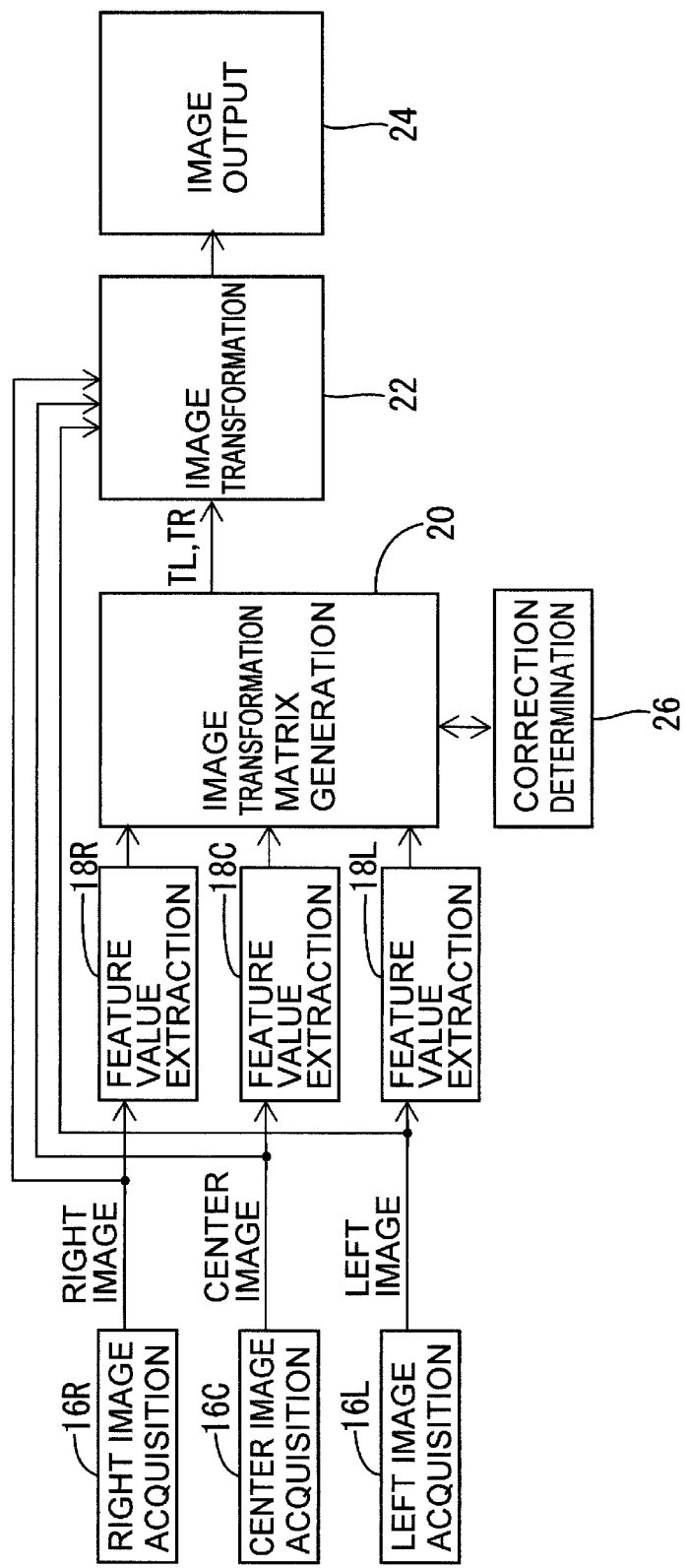
FIG. 1 is a functional block diagram illustrating an embodiment of this invention where this invention is applied to a composite video image creation apparatus that combines video images from three cameras in FIG. 2.

FIG. 1 is a functional block diagram of a composite video image creation apparatus 14 according to this invention, the composite video image creation apparatus 14 combing video images picked up by the three cameras 12L, 12C, 12R in FIG. 2. The composite video image creation apparatus 14 is configured to perform coordinate transformation of coordinate systems of respective video image s from the left camera 12L and the right camera 12R so as to be matched with a coordinate system of a video image from the center camera 12C and overlay these three video images to create a panoramic video image. In FIG. 1, a left image acquisition section 16L, a center image acquisition section 16C and a right image acquisition section 16R sequentially acquire respective images (left images, center images and right images) for video images picked up by the left camera 12L, the center camera 12C and the right camera 12R on a frame-by-frame basis in synchronization or asynchronization with one another.

Feature value extraction sections 18L, 18C, 18R perform detection of feature points and extraction of feature values of the detected feature points for a left image, a center image and a right image acquired at a same point of time (a same time or a substantially same time), in synchronization with one another. The detection of the feature points and the extraction of the feature values can be performed using, for example, a feature value extraction algorithm such as SIFT (Scale-invariant feature transform) or SURF (Speed-Upped Robust Feature). Note that detection of feature points and extraction of feature values by the feature value extraction sections 18L, 18C, 18R can be performed for every appropriate number of frames as well as for each frame. Performing detection of feature points and extraction of feature values for every appropriate number of frames enables reduction in arithmetic operation amount in comparison with a case where detection of feature points and extraction of feature values are performed for each frame.

An image transformation matrix generation section 20 detects a plurality of corresponding points in the left image and the center image based on the respective feature values extracted with respect to the left image and the center image. These corresponding points are corresponding points in the area ZLC (FIG. 2) in which the left image and the center image overlap each other. Also, the image transformation matrix generation section 20 detects a plurality of corresponding points in the center image and the right image based on the respective feature values extracted with respect to the center image and the right image. These corresponding points are corresponding points in the area ZCR (FIG. 2) in which the center image and the right image overlap each other. Detection of the corresponding points can be performed according to, for example, the following algorithm. Between a plurality of feature points in two images, degrees of similarity are calculated based on feature values detected with respect to the respective feature points according to, e.g., a least-square method. Feature points, a high degree of similarity between the feature points being high (where a least-square method is employed, feature points, a sum of squares of a difference between the feature points being equal to or below a predetermined threshold value close to zero), are determined. The determined feature points are detected as a corresponding point.

Furthermore, the image transformation matrix generation section 20 generates an image transformation matrix for mapping coordinate systems of the two images to each other, based on coordinates of the detected corresponding points. In other words, with respect to a pair of the left image and the center image, an image transformation matrix TL for matching the coordinate system of the left image with the coordinate system of the center image is generated with the coordinate system of the center image as a reference. Also, with respect to a pair of the center image and the right image, an image transformation matrix TR for matching the coordinate system of the right image with the coordinate system of the center image is generated with the coordinate system of the center image as a reference. Each of the image transformation matrices TL, TR can be generated, for example, as an affine transformation matrix.

An image transformation section 22 performs coordinate transformation of the left image and the right image using the generated image transformation matrices TL, TR, respectively. In other words, the image transformation section 22 performs a coordinate transformation of the left image using the image transformation matrix TL to match the coordinate system of the left image with the coordinate system of the center image. Also, the image transformation section 22 performs a coordinate transformation of the right image using the image transformation matrix TR to match the coordinate system of the right image with the coordinate system of the center image. As a result of these coordinate transformations, the coordinate systems of the left image and the right image are matched with the coordinate system of the center image. Note that coordinate transformation processing of an image at a certain point of time in the image transformation section 22 can be performed without waiting for an end of image transformation matrix generation processing based on the image in the image transformation matrix generation section 20. In other words, where coordinate transformation processing of an image at a certain point of time in the image transformation section 22 is performed after an end of image transformation matrix generation processing based on the image in the image transformation matrix generation section 20, if the image transformation matrix generation processing in the image transformation matrix generation section 20 requires time, the coordinate transformation processing of the image is delayed and the image is displayed with a delay corresponding to an amount of the delay. The delay in display is undesirable for use as an electronic mirror for a vehicle. Therefore, coordinate transformation processing of an image at a certain point of time in the image transformation section 22 is performed without waiting for an end of image transformation matrix generation processing based on the image in the image transformation matrix generation section 20. Consequently, a delay in display accompanying image transformation matrix generation processing can be eliminated. In this case, an image is subjected to coordinate transformation using an image transformation matrix generated based on an image acquired before the image. However, it is conceivable that if a time lag between both images (the image used for generation of the image transformation matrix and the image subjected to coordinate transformation using the generated image transformation matrix) is not so large, large misalignment is less likely to occur in a seam of images in a displayed panoramic image (or even if large misalignment occurs, the large misalignment is eliminated within a short length of time).

An image output section 24 creates a composite image by overlaying the left image, the center image and the right image with their coordinate systems matched and outputs the composite image. In this case, with respect to the mutually-overlapping areas ZLC, ZCR, for example, the relevant areas in the left image and the right image are masked and the relevant areas in the center image are output. As a result, a panoramic image in which the left image, the center image and the right image are stitched together is output from the image output section 24.

The composite video image creation apparatus 14 creates a panoramic video image by sequentially performing coordinate transformation processing in the image transformation section 22 and image overlaying processing in the image output section 24 for each frame. The panoramic video image created by the composite video image creation apparatus 14 is appropriately trimmed and displayed on the image display apparatus, such as a liquid-crystal display, disposed in front of the driver's seat. A driver can drive the vehicle while confirming the surroundings of the rear side of the vehicle (that is, a horizontal area of a wide angle from the left side to the right side through the center side of the rear side of the vehicle) by viewing the video image.

Figure 3:
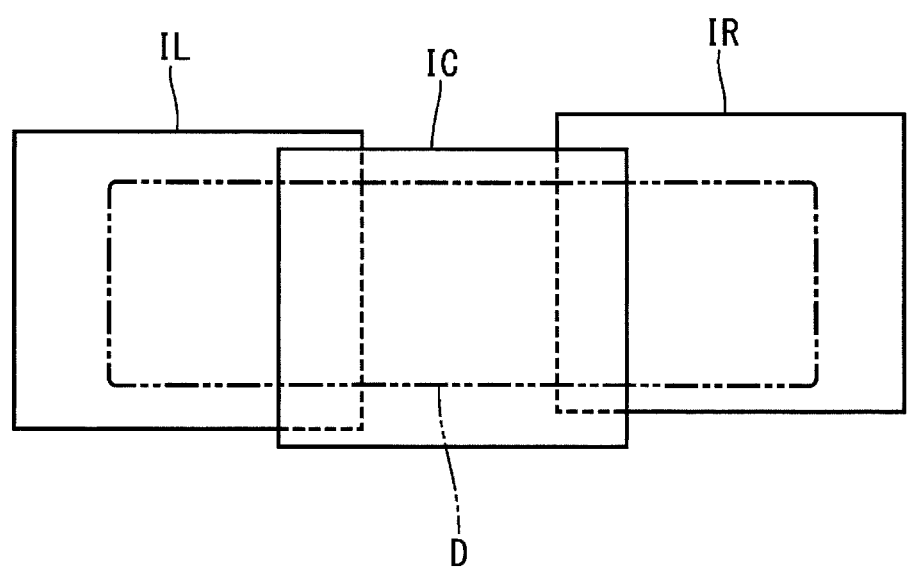
FIG. 3 is a schematic diagram illustrating an example of three images at a certain point of time, the three images being combined by the composite video image creation apparatus in FIG. 1, and a display area of the composite image obtained by the combination in an image display apparatus that displays the composite image.

FIG. 3 schematically illustrates an example of three images (a left image IL, a center image IC and a right image IR) at a certain point of time to be combined by the composite video image creation apparatus 14 and a display area D of the image display apparatus. The left image IL, the center image IC and the right image IR form a panoramic image by respective adjacent images being stitched together. The panoramic video image is appropriately trimmed and displayed on the display area D of the image display apparatus. A position of the center image IC can be fixed relative to the display area D by performing coordinate transformation with a coordinate system of the center image IC as a reference (that is, not moving the coordinate system of the center image IC) and fixing trimming positions relative to the center image IC. As a result, it is possible to prevent a video image of the center side of the rear side of the vehicle, which is important for driving of the vehicle, from flickering (fluctuating) due to image processing (coordinate transformation and trimming) and thus obtain a panoramic video image suitable for driving.

In FIG. 1, a correction determination section 26 compares a currently used image transformation matrix and a newly generated image transformation matrix to determine whether or not correction of the image transformation matrix is necessary. Here, the currently used image transformation matrix is an image transformation matrix generated based on a previously acquired image and currently used for coordinate transformation processing. Also, the newly generated image transformation matrix is an image transformation matrix generated based on a newly acquired image and not yet used for coordinate transformation processing. The correction determination section 26 determines whether or not these two image transformation matrices are similar, based on a predetermined determination criterion for determining a degree of difference or a degree of similarity between the two image transformation matrices. Then, if it is determined that the two image transformation matrices are "similar", the correction determination section 26 makes the image transformation section 22 perform coordinate transformation using the currently used image transformation matrix continuously. On the other hand, if it is determined that the two image transformation matrices are "dissimilar", the correction determination section 26 changes the image transformation matrix used for coordinate transformation to the newly generated image transformation matrix and makes the image transformation section 22 perform coordinate transformation.

The correction determination section 26 sets, for example, a determination criterion using a value based on differences in element value between respective elements corresponding to each other in the currently used image transformation matrix and the newly generated image transformation matrix, as an index value. Then, the correction determination section 26 determines a degree of difference or a degree of similarity between the two image transformation matrices using the determination criterion and performs a change of the image transformation matrix. In this case, if the index value does not exceed a predetermined threshold value (the degree of difference between the two image transformation matrices is low or the degree of similarity between the two image transformation matrices is high), the correction determination section 26 determines that the two image transformation matrices are similar and makes the image transformation section 22 perform coordinate transformation of an acquired image using the currently used image transformation matrix continuously. Also, if the index value exceeds the predetermined threshold value (the degree of difference between the two image transformation matrices is high or the degree of similarity between the two image transformation matrices is low), the correction determination section 26 determines that the two image transformation matrices are different. Then, the correction determination section 26 changes the image transformation matrix to the newly generated image transformation matrix and makes the image transformation section 22 perform coordinate transformation of an acquired image. Such image transformation matrix correction enables correction of misalignment of the coordinate systems of the left image, the center image and the right image. As a result, misalignment in a panoramic image can be suppressed. Also, by setting a threshold value to determine whether or not correction is necessary, correction of misalignment of the coordinate system between images is prevented when the misalignment is small and visually unnoticeable in a panoramic image. Consequently, frequent update of the image transformation matrix is suppressed and flickering in the composite video image is suppressed, enabling reduction of botheration given to a viewer. Note that the correction determination section 26 is not limited to one configured to, if an index value exceeds a threshold value, promptly perform correction of an image transformation matrix, but also can be configured to perform correction of an image transformation matrix on the condition that a state in which an index value exceeds the threshold value lasts for a predetermined length of time. Such configuration enables suppression of the image transformation matrix changing due to, e.g., instantaneous shaking of some video images of the three video images, and thus enables suppression of flickering occurring due to the other video images being affected by the change of the image transformation matrix.

Specifically, for the "index value based on differences in element value between respective elements corresponding to each other in the currently used image transformation matrix and the newly generated image transformation matrix" used by the correction determination section 26 as a determination criterion, for example, index values (a) to (d) below can be used. However, the index value is not limited to these examples.

Index value (a): Value obtained as a total value of respective absolute values by, with respect to all elements of the two image transformation matrices, taking absolute values of differences in element value between the respective elements on an element-by-element basis.

Index value (b): Value obtained as a total value of respective square values by, with respect to all elements of the two image transformation matrices, taking square values of differences in element value between the respective elements on an element-by-element basis Index value (c): Value obtained as a total value of respective absolute values by, with respect to not all elements but particular elements of the two image transformation matrices, taking absolute values of differences in the element value between the respective elements on an element-by-element basis Index value (d): Value obtained as a total value of respective square values by, with respect to not all elements but particular elements of the two image transformation matrices, taking square values of differences in element value between the elements on an element-by-element basis Where the index value (c) or (d) based on particular elements in image transformation matrices is used, an arithmetic operation amount can be reduced in comparison with a case where the index value (a) or the index value (b) based on all elements in image transformation matrices is used, enabling a speed increase of determination of whether or not correction is necessary.

Each of the index values (a) to (d) becomes a smaller value as the currently used image transformation matrix and the newly generated image transformation matrix are more similar (that is, the degree of difference is lower or the degree of similarity is higher). Therefore, where any of the index values (a) to (d) is used, if a calculated value of the relevant index value of the index values (a) to (d) is equal to or smaller than a predetermined threshold value set as a determination criterion, the correction determination section 26 determines that the two image transformation matrices are "similar". At this time, the correction determination section 26 makes the image transformation section 22 perform coordinate transformation of an acquired image using the currently used image transformation matrix continuously. Also, if a calculated value of the relevant index value of the index values (a) to (d) is larger than the predetermined threshold value set as a determination criterion, the correction determination section 26 determines that the two image transformation matrices are "dissimilar". At this time, the correction determination section 26 changes the image transformation matrix to the newly generated image transformation matrix and makes the image transformation section 22 perform coordinate transformation of an acquired image.

Here, the below description will be provided assuming that affine transformation is used for coordinate transformation in this embodiment. As publicly known, affine transformation is transformation that is a combination of parallel translation, scaling (enlargement/shrinking), skewing (shearing) and rotation. However, for usage as the viewing device for a vehicle of this embodiment, since the photographing magnifications of the cameras 12L, 12C, 12R are fixed and equal to one another, no image magnification change occurs. Also, no image shearing occurs. Therefore, if any change in coordinate system occurs among the images from the cameras 12L, 12C, 12R, such change can be considered as being attributable to parallel translation or rotation. Therefore, it is considered that affine transformation matrix elements used in the correction determination section 26 for determination of whether or not correction of the image transformation matrix is necessary can be limited to elements relating to a parallel translation amount and elements relating to rotation angles. An affine transformation expression that is a combination of parallel translation and rotation is expressed by Expression 1a or Expression 1b.

[Expression 1a]

$$\underset{\text{after coordinate transformation}}{\text{(Coordinates}} \quad \underset{\text{before coordinate transformation}}{\text{(Coordinates}} \quad \underset{\text{matrix)}}{\text{(Affine transformation}} \tag{1a}$$

$$[X \ Y \ 1] = [x \ y \ 1] \begin{bmatrix} \cos(q) & \sin(q) & 0 \\ -\sin(q) & \cos(q) & 0 \\ t_x & t_y & 1 \end{bmatrix}$$

[Expression 1b]

$$\underset{\text{after coordinate transformation}}{\text{(Coordinates}} \quad \underset{\text{matrix)}}{\text{(Affine transformation}} \quad \underset{\text{before coordinate transformation}}{\text{(Coordinates}} \tag{1b}$$

$$\begin{bmatrix} X \\ Y \\ 1 \end{bmatrix} = \begin{bmatrix} \cos(q) & -\sin(q) & t_x \\ \sin(q) & \cos(q) & t_y \\ 0 & 0 & 1 \end{bmatrix} \begin{bmatrix} x \\ y \\ 1 \end{bmatrix}$$

In Expression 1a or Expression 1b, x and y are coordinates before coordinate transformation, X and Y are coordinates after coordinate transformation, tx is an amount of parallel translation in an x-axis direction, ty is an amount of parallel translation in a y-axis direction and q is an angle of rotation.

Where the above-described index value (c) or (d) is used, the correction determination section 26 can use, for example, two elements that are elements tx, −sin(q) in the affine transformation matrix in Expression 1a or Expression 1b, as "particular elements". In this case, the index values (c) and (d) are expressed by Expressions 2 and 3, respectively.

[Expression 2]

Index value (c)='currently used tx value−newly calculated tx value'+'currently used−sin(q) value−newly calculated−sin(q) value' (2)

[Expression 3]

Index value (d)=(currently used tx value−newly calculated tx value)$^2$+(currently used−sin(q) value−newly calculated−sin(q) value)$^2$ (3)

In addition, where the index value (c) or (d) is used, the correction determination section 26 can use not only two elements but also, for example, three elements that are elements tx, ty, −sin(q). Also, instead of the element −sin(q), an element cos(q) can be used.

A series of control contents for creating a composite video image by the composite video image creation apparatus 14 in FIG. 1 will be described with reference to FIG. 4. The left image acquisition section 16L, the center image acquisition section 16C and the right image acquisition section 16R sequentially acquire left images, center images and right images for video images picked up by the left camera 12L, the center camera 12C and the right camera 12R, respectively, on a frame-by-frame basis (S1). With regard to a left image, a center image and a right image acquired at a same point of time, the feature value extraction sections 18L, 18C, 18R perform image transformation (for example, converting to gray scale) for extracting feature values, respectively. Next, the feature value extraction section 18L, 18C, 18R perform extraction of feature values from the respective images subjected to the image transformation (detection of feature points and calculation of feature values of the detected feature points) (S2). Note that as described above, extraction of feature values can be performed for every appropriate number of frames, as well as for each frame.

The image transformation matrix generation section 20 detects a plurality of corresponding points in the left image and the center image, and a plurality of corresponding points in the center image and the right image, based on the respective feature values extracted with respect to the left image, the center image and the right image. Furthermore, the image transformation matrix generation section 20 generates image transformation matrices TL, TR for matching the corresponding points with each other, based on coordinates of the detected corresponding points (S3). In other words, with respect to the left image and the center image, the image transformation matrix generation section 20 generates an image transformation matrix TL for performing coordinate transformation of the left image so as to match the corresponding points in the left image with the corresponding points in the center image. Also, with respect to the center image and the right image, the image transformation matrix generation section 20 generates an image transformation matrix TR for performing coordinate transformation of the right image so as to match the corresponding points in the right image with the corresponding points in the center image.

For each of the image transformation matrices TL, TR, the correction determination section 26 compares the currently used image transformation matrix and the newly generated image transformation matrix to determine whether or not correction of the image transformation matrix is necessary. In other words, the correction determination section 26 determines whether or not correction of the image transformation matrix is necessary, according to whether or not an index value based on differences in element value between the corresponding elements in the currently used image transformation matrix and the newly generated image transformation matrix exceeds a predetermined threshold value (S4). Then, the correction determination section 26 determines that the correction is not necessary if the index value does not exceed the threshold value ("NO" in S4) and makes the image transformation section 22 perform coordinate transformation of acquired images using the currently used image transformation matrices TL, TR continuously (S5). Also, if the index value exceeds the threshold value ("YES" in S4) and the state in which the index value exceeds the threshold value lasts for a predetermined length of time ("YES" in S6), the correction determination section 26 determines that the correction is necessary and changes the image transformation matrix to the newly generated image transformation matrix and makes the image transformation section 22 perform coordinate transformation of acquired images (S7). Also, if the index value exceeds the threshold value ("YES" in S4) but the state in which the index value exceeds the threshold value does not last for the predetermined length of time ("NO" in S6), the correction determination section 26 determines that the correction is not necessary and makes the image transformation section 22 perform coordinate transformation of acquired images using the currently used image transformation matrices TL, TR continuously (S5). The image transformation matrix correction processing (S4 to S7) is performed independently for each of the image transformation matrices TL, TR.

The image transformation section 22 sequentially acquires left images, center images and right images on a frame-by-frame basis from respective video images picked up by the left camera 12L, the center camera 12C and the right camera 12R (S8). Then, with respect to each left image, the image transformation section 22 performs coordinate transformation of the left image using the image transformation matrix TL designated by the correction determination section 26 to match a coordinate system of the left image with a coordinate system of the corresponding center image. Also, with respect to each right image, the image transformation section 22 performs coordinate transformation of the right image using the image transformation matrix TR designated by the correction determination section 26 to match a coordinate system of the right image with the coordinate system of the corresponding center image (S9). The image output section 24 overlays the left image, the center image and the right image with their coordinate systems matched, to create a panoramic composite image (S9 and S10).

The composite video image creation apparatus 14 according to the above embodiment is useful, for example, in the following situations.

(a) Even if displacement occurs in positions of the cameras relative to each other due to, e.g., the vehicle shaking largely or a camera colliding with an obstacle, the image transformation matrices are corrected and misalignment of seams of images is automatically corrected.

(b) Where cameras are of an electric folding type, if any of cameras stops at a position that is slightly shifted from a correct position, in an extended position, the image transformation matrices are corrected and seams of images are automatically aligned.

(c) Where a plurality of cameras are added in a vehicle later to compose a panoramic video image, directions of the respective cameras are mere roughly set, and then, the image transformation matrices are automatically corrected and seams of images are aligned.

(d) Where a function that enables a driver to electrically adjust directions of respective cameras via remote control is mounted, when the directions of the cameras are adjusted, the image transformation matrices are automatically corrected and seams of images are aligned.

The following embodiments of this invention are also possible.

(a) In the above embodiment, if it is determined that the currently used image transformation matrix and the newly generated image transformation matrix are dissimilar, the image transformation matrix used for coordinate transformation is changed to the newly generated image transformation matrix at one time (that is, at one frame); however, this invention is not limited to this example. In other words, the image transformation matrix can be changed gradually (that is, in a stepwise manner with a plurality of frames) instead of changing at one time. In this way, flickering (fluctuation) of a composite video image can be made unnoticeable.

(b) In the above embodiment, coordinate transformation processing of an image at a certain point of time in the image transformation section is performed without waiting for an end of image transformation matrix generation processing based on the image in the image transformation matrix generation section; however, this invention is not limited to this example. In other words, coordinate transformation processing of an image at a certain point of time in the image transformation section can be performed after an end of image transformation matrix generation processing based on the image in the image transformation matrix generation section (that is, coordinate transformation of an image at a certain point of time can be performed using an image transformation matrix generated based on the image).

(c) In the above embodiment, coordinate transformation of each of respective coordinate systems of a left image and a right image is performed so as to be matched with a coordinate system of a center image; however, this invention is not limited to this example. In other words, a coordinate transformation of a coordinate system of a center image can be performed so as to be matched with a coordinate system of a left image and a coordinate transformation of a coordinate system of a right image can be performed so as to be matched with the coordinate system of the center image subjected to the coordinate transformation (or coordinate transformations can be performed sequentially in an order opposite to the above).

(d) In the above embodiment, alignment of adjacent two images is performed by performing coordinate transformation of a coordinate system of only one of the images so as to be matched with a coordinate system of the other image; however, this invention is not limited to this example. In other words, coordinate transformation of coordinate systems of both images can be performed to perform alignment.

(e) In the above embodiment, images picked up by cameras are subjected to coordinate transformation and combined, in a state as they are; however, this invention is not limited to this example. In other words, images obtained by performing appropriate image processing (for example, viewpoint transformation processing or distortion correction processing) on images picked up by cameras can be subjected to coordinate transformation and combined.

(f) The above embodiment indicates a case where this invention is applied to a system including three cameras; this invention is not limited to this example. In other words, this invention is applicable also to a system including two cameras or a system including four or more cameras.

(g) In the above embodiment, affine transformation matrices are used as image transformation matrices; however, other image transformation matrices can be used. For example, where rotation and parallel translation only need to be taken into consideration, rigid transformation matrices can be used.

(h) The above embodiment indicates a case where this invention is applied to an electronic mirror that picks up and displays an image of a video image of the rear side of a vehicle; this invention is not limited to this example. In other words, this invention is applicable also to, for example, a system that creates a bird's eye-view image of the surroundings of a vehicle by performing viewpoint transformation of video images from a plurality of cameras mounted in the vehicle and stitching the video images together.

While a composite video image creation program is described herein, it is to be known and understood that such composite video image creation program may be included in or on a memory. The memory may be, for example, a non-transitory computer-readable memory. The memory may include a static memory, a dynamic memory, or both in communication. The memory is a tangible storage medium that can store data and executable instructions, and is non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memory is an article of manufacture and/or machine component. The memory, or composite video image creation program therein, may be read by a computer, a processor thereof, the composite video image creation apparatus, and/or any other device which is generally known and understood in the art. The memory may be a random access memory (RAM), a read only memory (ROM), a flash memory, an electrically programmable read only memory (EPROM), an electrically erasable programmable read-only memory (EEPROM), a register, a hard disk, a cache, a removable disk, tape, a compact disk read only memory (CD-ROM), a digital versatile disk (DVD), a floppy disk, a blu-ray disk, or any other form of storage medium known in the art. The memory may be volatile or non-volatile, secure and/or encrypted, unsecure and/or unencrypted. Of course, the memory may also comprise any combination of memories or be a single storage.

The invention claimed is:

1. A composite video image creation apparatus for creating a composite video image by stitching two video images each including a mutually-overlapping area in which the two video images overlap each other, via the mutually-overlapping areas, the composite video image creation apparatus comprising an image acquisition section, a feature value extraction section, an image transformation matrix generation section, an image transformation section, an image output section and a correction determination section, wherein:

the image acquisition section sequentially acquires two images, one from each of the two video images;

the feature value extraction section detects respective feature points with respect to the acquired two images and extracts respective feature values of the detected feature points;

the image transformation matrix generation section detects corresponding points in the two images based on the extracted feature values of the feature points, and sequentially generates an image transformation matrix for mapping coordinate systems of the two images to each other, based on coordinates of the detected corresponding points;

the image transformation section performs coordinate transformation of at least one image of the two images using the generated image transformation matrix to perform mapping of the coordinate systems of the two images to each other;

the image output section creates a composite image by overlaying the two images with the respective coordinate systems mapped to each other, and outputs the composite image;

the correction determination section compares the currently used image transformation matrix and the newly generated image transformation matrix with each other to determine whether or not the two image transformation matrices are similar, based on a predetermined determination criterion for determining a degree of difference or a degree of similarity between the two image transformation matrices, and if it is determined that the two image transformation matrices are similar, makes the image transformation section perform the coordinate transformation using the currently used image transformation matrix continuously, and if it is determined that the two image transformation matrices are dissimilar, makes the image transformation section perform the coordinate transformation using an image transformation matrix corrected with the newly generated image transformation matrix; and the composite video image creation apparatus creates the composite video image by sequentially performing creation of the composite image according to progress of time.

2. The composite video image creation apparatus according to claim 1, wherein the correction determination section determines the degree of difference or the degree of similarity between the two image transformation matrices using the determination criterion, in which a value based on a difference in element value between respective elements corresponding to each other in the currently used image transformation matrix and the newly generated image transformation matrix is used as an index value of the determination criterion.

3. The composite video image creation apparatus according to claim 1, wherein the feature value extraction section extracts the feature values with respect to images at an appropriate time interval.

4. The composite video image creation apparatus according to claim 1, wherein if it is determined that the image transformation matrices are dissimilar, the correction determination section corrects the image transformation matrix used for the coordinate transformation, with the newly generated image transformation matrix on a condition that the state in which the image transformation matrices are determined as being dissimilar lasts for a predetermined length of time.

5. The composite video image creation apparatus according to claim 1, wherein with respect to three or more video images in which each adjacent two video images each include a mutually-overlapping area in which the two video images overlap each other, a composite video image is created by performing the processing in each of the respective sections for each adjacent two video images and stitching the three or more video images via the mutually-overlapping areas.

6. The composite video image creation apparatus according to claim 1, wherein with respect to three video images of a left side, a center side and a right side of a rear side of a vehicle, in which each adjacent two video images each include a mutually-overlapping area in which the two video images overlap each other, a composite video image is created by performing each of the processes for each adjacent two video images and stitching the three video images via the mutually-overlapping areas.

7. The composite video image creation apparatus according to claim 6, wherein:

with respect to three images acquired from the three video images, the image transformation matrix generation section generates respective image transformation matrices for mapping coordinate systems of the two images of the left side and the right side to a coordinate system of the image of the center side to each other;

the image transformation section maps the coordinate systems of the images of the left side and the right side to the coordinate system of the image of the center side by performing coordinate transformation of the images of the left side and the right side using the respective generated image transformation matrices; and the image output section creates the composite image by overlaying the three images with the respective coordinate systems mapped to one another and outputs the composite image.

8. The composite video image creation apparatus according to claim 6, wherein the correction determination section determines the degree of difference or the degree of similarity between the two image transformation matrices using the determination criterion using, as an index value, a value based on a difference in element value between respective elements each reflecting a parallel translation amount and a difference in element value between respective elements each reflecting a rotation angle in the two image transformation matrices.

9. A non-transitory computer-readable medium including a composite video image creation program that, when executed, causes an information processing apparatus to function as the composite video image creation apparatus according to claim 1.

10. A composite video image creation method for creating a composite video image by stitching two video images each including a mutually-overlapping area in which the two video images overlap each other, via the mutually-overlapping area, the composite video image creation method comprising:

sequentially acquiring two images, one from each of the two video images;

sequentially generating an image transformation matrix for mapping coordinate systems of the two images to each other;

performing mapping of the coordinate systems of the two images to each other by performing coordinate transformation of at least one image of the two images using the generated image transformation matrix;

creating a composite image by overlaying the two images with the respective coordinate systems mapped to each other;

comparing the currently used image transformation matrix and the newly generated image transformation matrix with each other, and if it is determined, based on a predetermined determination criterion for determining a degree of difference or a degree of similarity between the two image transformation matrices, that the two image transformation matrices are similar, performing the coordinate transformation using the currently used image transformation matrix continuously, and if it is determined that the two image transformation matrices are dissimilar, performing the coordinate transformation using an image transformation matrix corrected with the newly generated image transformation matrix; and creating the composite video image by sequentially performing creation of the composite image according to progress of time.

11. A non-transitory computer-readable medium including a composite video image creation program that, when executed, causes an information processing apparatus to execute the composite video image creation method according to claim 10.

12. A non-transitory computer-readable medium including an executable composite video image creation program for creating a composite video image by stitching two video images each including a mutually-overlapping area in which the two video images overlap each other, via the mutually-overlapping area, the executable composite video image creation program, when executed by a processor, causing the processor to perform operations comprising:

sequentially acquiring two images, one from each of the two video images;

sequentially generating an image transformation matrix for mapping coordinate systems of the two images to each other;

performing mapping of the coordinate systems of the two images to each other by performing coordinate transformation of at least one image of the two images using the generated image transformation matrix;

creating a composite image by overlaying the two images with the respective coordinate systems mapped to each other;

comparing the currently used image transformation matrix and the newly generated image transformation matrix with each other, and if it is determined, based on a predetermined determination criterion for determining a degree of difference or a degree of similarity between the two image transformation matrices, that the two image transformation matrices are similar, performing the coordinate transformation using the currently used image transformation matrix continuously, and if it is determined that the two image transformation matrices are dissimilar, performing the coordinate transformation using an image transformation matrix corrected with the newly generated image transformation matrix; and creating the composite video image by sequentially performing creation of the composite image according to progress of time.

* * * * *